United States Patent
Suciu et al.

(10) Patent No.: US 9,845,726 B2
(45) Date of Patent: Dec. 19, 2017

(54) GAS TURBINE ENGINE WITH HIGH SPEED LOW PRESSURE TURBINE SECTION

(71) Applicant: United Technologies Corporation, Hartford, CT (US)

(72) Inventors: Gabriel L. Suciu, Glastonbury, CT (US); Frederick M. Schwarz, Glastonbury, CT (US); William K. Ackermann, East Hartford, CT (US); Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 159 days.

(21) Appl. No.: 14/568,167

(22) Filed: Dec. 12, 2014

(65) Prior Publication Data

US 2015/0089958 A1   Apr. 2, 2015

Related U.S. Application Data

(63) Continuation-in-part of application No. 13/410,776, filed on Mar. 2, 2012, now abandoned, and a
(Continued)

(51) Int. Cl.
*F02C 3/06* (2006.01)
*F02C 7/36* (2006.01)
(Continued)

(52) U.S. Cl.
CPC .................. *F02C 3/06* (2013.01); *F02C 3/04* (2013.01); *F02C 7/36* (2013.01); *F02K 3/02* (2013.01);
(Continued)

(58) Field of Classification Search
CPC ...... F02C 3/06; F02C 3/04; F02C 7/36; F02K 3/072; F02K 3/04; F02K 3/06; F02K 3/02
See application file for complete search history.

(56) References Cited

U.S. PATENT DOCUMENTS 2,936,655 A   5/1960   Peterson et al.
3,021,731 A   2/1962   Stoeckicht
(Continued)

FOREIGN PATENT DOCUMENTS

CN   1952367 A   4/2007
GB   1516041     6/1978
(Continued)

OTHER PUBLICATIONS

Nagendra, S. et al., "Optimal rapid multidisciplinary response networks: RAPIDDISK," Structural and Multidisciplinary Optimization, Springer, Berlin, DE, vol. 29, No. 3, Mar. 1, 2005, pp. 213-231.

(Continued)

*Primary Examiner* — Steven Sutherland
(74) *Attorney, Agent, or Firm* — Carlson, Gaskey & Olds, PC

(57) ABSTRACT

A gas turbine engine includes a very high speed low pressure turbine such that a quantity defined by the exit area of the low pressure turbine multiplied by the square of the low pressure turbine rotational speed compared to the same parameters for the high pressure turbine is at a ratio between about 0.5 and about 1.5.

18 Claims, 2 Drawing Sheets

Related U.S. Application Data continuation-in-part of application No. 13/363,154, filed on Jan. 31, 2012, now abandoned.

(60) Provisional application No. 61/604,653, filed on Feb. 29, 2012.

(51) Int. Cl.
*F02K 3/02* (2006.01)
*F02K 3/06* (2006.01)
*F02C 3/04* (2006.01)
*F02K 3/04* (2006.01)
*F02K 3/072* (2006.01)

(52) U.S. Cl.
CPC .................. *F02K 3/04* (2013.01); *F02K 3/06* (2013.01); *F02K 3/072* (2013.01); *F05D 2220/3215* (2013.01)

(56) References Cited

U.S. PATENT DOCUMENTS

| | | | |
|---|---|---|---|
| 3,287,906 A | 11/1966 | McCormick | |
| 3,352,178 A | 11/1967 | Lindgren et al. | |
| 3,434,288 A * | 3/1969 | Petrie | F01D 25/16 415/144 |
| 3,729,957 A | 5/1973 | Petrie et al. | |
| 3,754,484 A | 8/1973 | Roberts | |
| 3,886,737 A | 6/1975 | Grieb | |
| 3,892,358 A | 7/1975 | Gisslen | |
| 4,130,872 A | 12/1978 | Harloff | |
| 4,827,712 A * | 5/1989 | Coplin | F02K 3/06 415/210.1 |
| 4,887,424 A | 12/1989 | Geidel et al. | |
| 4,909,031 A | 3/1990 | Grieb | |
| 4,947,642 A | 8/1990 | Grieb et al. | |
| 5,010,729 A | 4/1991 | Adamson et al. | |
| 5,433,674 A | 7/1995 | Sheridan | |
| 5,447,411 A | 9/1995 | Curley et al. | |
| 5,520,512 A | 5/1996 | Walker et al. | |
| 5,524,847 A | 6/1996 | Brodell et al. | |
| 5,778,659 A | 7/1998 | Duesler et al. | |
| 5,857,836 A | 1/1999 | Stickler et al. | |
| 5,915,917 A | 6/1999 | Eveker et al. | |
| 5,975,841 A | 11/1999 | Lindemuth et al. | |
| 6,223,616 B1 | 5/2001 | Sheridan | |
| 6,318,070 B1 | 11/2001 | Rey et al. | |
| 6,381,948 B1 | 5/2002 | Klingels | |
| 6,814,541 B2 | 11/2004 | Evans et al. | |
| 7,021,042 B2 | 4/2006 | Law | |
| 7,451,592 B2 | 11/2008 | Taylor et al. | |
| 7,513,102 B2 | 4/2009 | Moniz et al. | |
| 7,513,103 B2 | 4/2009 | Orlando et al. | |
| 7,591,754 B2 | 9/2009 | Duong et al. | |
| 7,600,370 B2 | 10/2009 | Dawson | |
| 7,694,505 B2 | 4/2010 | Schilling | |
| 7,721,549 B2 | 5/2010 | Baran | |
| 7,824,305 B2 | 11/2010 | Duong et al. | |
| 7,926,260 B2 | 4/2011 | Sheridan et al. | |
| 8,061,969 B2 | 11/2011 | Durocher et al. | |
| 8,091,371 B2 | 1/2012 | Durocher et al. | |
| 8,205,432 B2 | 6/2012 | Sheridan | |
| 2009/0007569 A1* | 1/2009 | Lemmers, Jr. | F02C 7/275 60/792 |
| 2009/0092494 A1 | 4/2009 | Cairo et al. | |
| 2009/0229242 A1 | 9/2009 | Schwark | |
| 2009/0266912 A1* | 10/2009 | Gukeisen | F02K 1/1253 239/265.33 |
| 2010/0105516 A1 | 4/2010 | Sheridan | |
| 2010/0148396 A1 | 6/2010 | Xie et al. | |
| 2010/0331139 A1 | 12/2010 | McCune | |
| 2012/0171018 A1 | 7/2012 | Hasel et al. | |
| 2012/0291449 A1 | 11/2012 | Adams | |
| 2013/0192200 A1 | 8/2013 | Kupratis et al. | |
| 2013/0192263 A1 | 8/2013 | Suciu et al. | |
| 2013/0195648 A1 | 8/2013 | Schwarz et al. | |
| 2013/0223986 A1 | 8/2013 | Kupratis et al. | |
| 2014/0130479 A1 | 5/2014 | Schwarz et al. | |
| 2016/0032826 A1 | 2/2016 | Rued | |

FOREIGN PATENT DOCUMENTS

| | | |
|---|---|---|
| GB | 2041090 | 9/1980 |
| JP | 57-171032 A | 10/1982 |
| JP | 2014156861 A | 8/2014 |
| WO | 2007038674 | 4/2007 |
| WO | 2014018142 A2 | 1/2014 |

OTHER PUBLICATIONS

European Search Report for European Patent Application No. 13775188.9 dated Nov. 3, 2015.

"The Geared Turbofan Technology—Opportunities, Challenges and Readiness Status," C. Riegler, C. Bichlmaier, MTU Aero Engines GmbH, Germany.

"Geared Fan," Dr Gunter Wilfert, MTU Aero Engines, Germany.

"CLEAN—Validation of a GTF High Speed Turbine and Integration of Heat Exchanger Technology in an Environmental Friendly Engine Concept," Gunter Wilfert, et al., ISABE—2005-1156.

"CLEAN—Validation of a High Efficient Low NOx core, a GTF High Speed Turbine and an Integration of a Recuperator in an Environmental Friendly engine Concept," Dr. Gunter Wilfert, et al., AIAA 2005-4195, Jul. 1-13, 2005.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air, 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-1, 56-8, 60-1, 64-71, 87-9, 324-9, 436-7.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers, 108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

(56) References Cited

OTHER PUBLICATIONS

Knip, Jr., G. (1987). Analysis of an advanced technology subsonic turbofan incorporating revolutionary materials. NASA Technical Memorandum. May 1987. pp. 1-23.
Willis, W.S. (1979). Quiet clean short-haul experimental engine (QCSEE) final report. NASA/CR-159473 pp. 1-289.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press. p. 465.
Ramsden, J.M. (Ed). (1978). The new European airliner. Flight International, 113(3590). Jan. 7, 1978. pp. 39-43.
Langston, L. and Faghri, A. Heat pipe turbine vane cooling. Prepared for Advanced Turbine Systems Annual Program Review. Morgantown, West Virginia. Oct. 17-19, 1995. pp. 3-9.
Oates, G.C. (Ed). (1989). Aircraft propulsion systems and technology and design. Washington, D.C.: American Institute of Aeronautics, Inc. pp. 341-344.
Lau, K, Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc. pp. 145, 355-358.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc. pp. 8-15.
Pyrograf-III Carbon Nanofiber. Product guide. Retrieved Dec. 1, 2015 from: http://pyrografproducts.com/Merchant5/merchant.mvc?Screen=cp_nanofiber.
Nanocor Technical Data for Epoxy Nanocomposites using Nanomer 1.30E Nanoclay. Nnacor, Inc. Oct. 2004.
Ratna, D. (2009). Handbook of thermoset resins. Shawbury, UK: iSmithers. pp. 187-216.
Wendus, B.E., Stark, D.F., Holler, R.P., and Funkhouser, M.E. (2003). Follow-on technology requirement study for advanced subsonic transport. NASA/CR-2003-212467. pp. 1-37.
Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.
Merriam-Webster's collegiate dictionary, 11th Ed. (2009). p. 824.
Merriam-Webster's collegiate dictionary, 10th Ed. (2001). p. 1125-1126.
Whitaker, R. (1982). ALF 502: plugging the turbofan gap. Flight International, p. 237-241, Jan. 30, 1982.
Hughes, C. (2010). Geared turbofan technology. NASA Environmentally Responsible Aviation Project. Green Aviation Summit. NASA Ames Research Center. Sep. 8-9, 2010. pp. 1-8.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Moxon, J. How to save fuel in tomorrow's engines. Flight International. Jul. 30, 1983. 3873(124). pp. 272-273.
File History for U.S. Appl. No. 12/131,876.
Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.
Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.
Ivchenko-Progress D-436. Jane's Aero-engines, Aero-engines—Turbofan. Feb. 8, 2012.
Ivchenko-Progress AI-727M. Jane's Aero-engines, Aero-engines—Turbofan. Nov. 27, 2011.
Ivchenko-Progress D-727. Jane's Aero-engines, Aero-engines—Turbofan. Feb. 7, 2007.
Turbomeca Aubisque. Jane's Aero-engines, Aero-engines—Turbofan. Nov. 2, 2009.
Aviadvigatel D-110. Jane's Aero-engines, Aero-engines—Turbofan. Jun. 1, 2010.
Rolls-Royce M45H. Jane's Aero-engines, Aero-engines—Turbofan. Feb. 24, 2010.
Honeywell LF502. Jane's Aero-engines, Aero-engines—Turbofan. Feb. 9, 2012.
Honeywell LF507. Jane's Aero-engines, Aero-engines—Turbofan. Feb. 9, 2012.
Honeywell TFE731. Jane's Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
European Search Report for European Application No. 15199577.6 dated May 12, 2016.
NASA/TM 2010-216758—Assessment of Aerodynamic Challenges of a Variable-Speed Power Turbine for Large Civil Tilt-Rotor Application, Welch, Aug. 2010.
NASA/TM 2012-217605—Variable-Speed-Power-Turbine Research at Glenn Research Center, Welch, Jul. 2012.
P&W Propulsion Systems Studies, NASA High Speed Research Workshop, May 14-16, 1991.
Design Optimization of a Variable-Speed Power-Turbine, Hendricks, et al., Jul. 2014.
NASA/CR 2012-217424—Variable-Speed Power-Turbine for the Large Civil Tilt Rotor, Suchezky, Feb. 2012.
Architectural Comparison of Advanced Ultra-High Bypass Ratio Turbofans for Medium to Long Range Application, Bijewitz, 2014.
Prior Art Direct Drive Engines.
Energy Efficient Engine High-Pressure Turbine Uncooled Rig Technology Report, NASA CR-16149, Oct. 1981.
Federal Aviation Administration Advisory Circular dated Apr. 13, 2006 on Calibration Test, Endurance Test and Teardown Inspection for Turbine Engine Certification.
Aircraft Engine Design, Second Edition, Jack D. Matingly, pp. 290-292.
Jane's Aero-Engines, Issue Seven, Copyright 2000, pp. 510-512.
International Search Report from parent counterpart PCT application PCT/US13/22378, dated Sep. 13, 2013.
Kandebo, Stanley, "Geared_Turbofan Engine Design Target Cost,Complexity," 1998, Aviation Week & Space Technology, vol. 148, Issue 8, start p. 32.
Mattingly, et al., Aircraft Engine Design, 2002, American Institute of Aeronautics and Astronautics, 2nd Edition, p. 292.
Petition for Inter Partes Review of U.S. Pat. No. 8,899,915. *General Electric Company*, Petitioner, v. *United Technologies Corporation*, Patent Owner. Filed Dec. 21, 2016.
Kurzke, J., Preliminary Design, Aero-Engine Design: From State of the Art Turbofans Towards Innovative Architectures. Mar. 3-7, 2008. pp. 1-72.

(56) References Cited

OTHER PUBLICATIONS

Willis, W.S., Quiet Clean Short-Haul Experimental Engine (QCSEE) Final Report. Aug. 1979.

Leckie, F.A. and Dal Bello, D.J. (2009). Strength and stiffness of engineering systems. Mechanical Engineering Series. Springer. pp. 1-3 (improperly identified as Bauchau on IPR Petition (filed on IDS dated Feb. 2016).

Declaration of Raymond Drago. In re U.S. Pat. No. 8,899,915 under 37 C.F.R. § 1.68. Executed Dec. 9, 2016. pp. 1-38.

Thulin, R.D. et al., NASA CR-165608, Energy Efficient Engine, High-Pressure Turbine Detailed Design Report. Jan. 1982.

NASA CR-165608, Energy Efficient Engine,High-Pressure Turbine Detailed Design Report by Robert D. Thulin, et al.

IPR Petition of U.S. Pat. No. 8899915, dated Dec. 21, 2016.

Decision Denying Institution of Inter Partes Review. *General Electric Company.*, Petitioner, v. *United Technologies Corp.*, Patent Owner. IPR2017-00522. U.S. Pat. No. 8,899,915. Entered Jun. 23, 2017. pp. 1-18.

European Search Report for European Application No. 16197814.3 dated Mar. 30, 2017.

\* cited by examiner

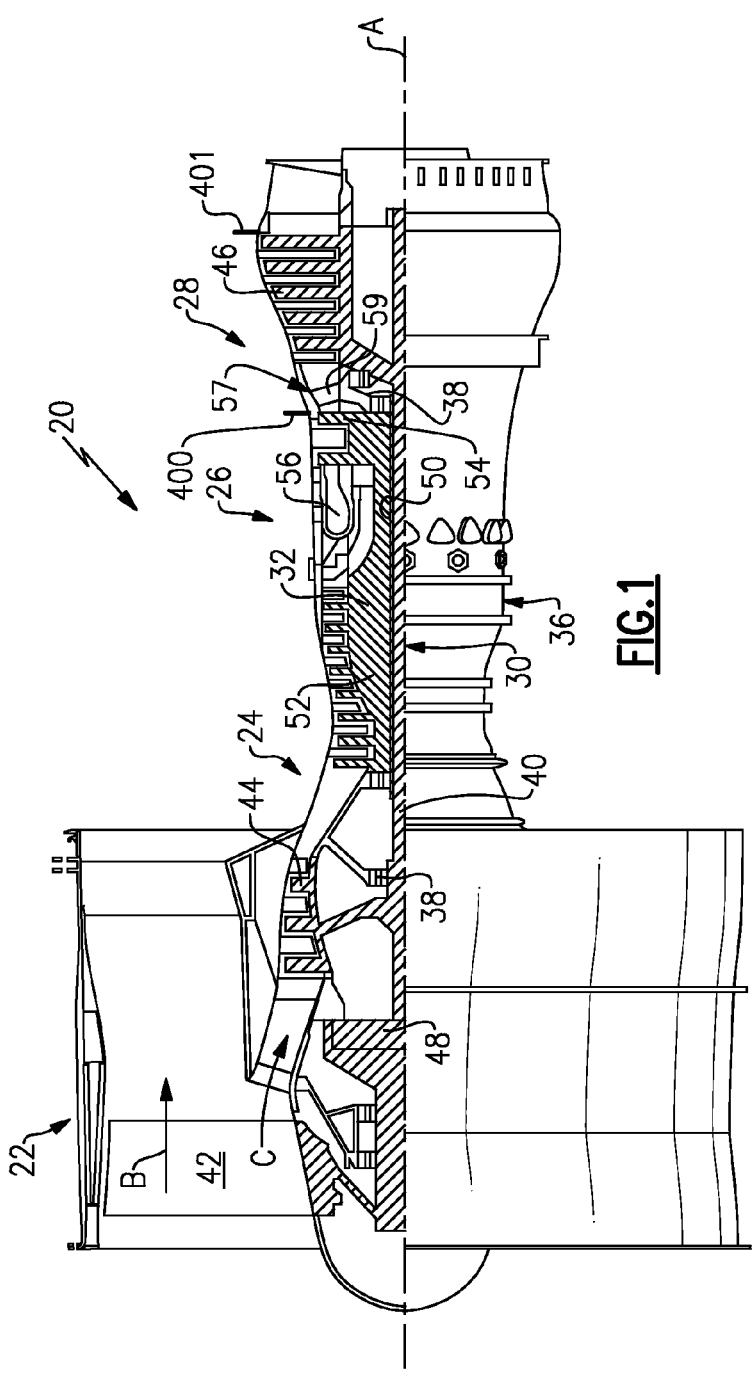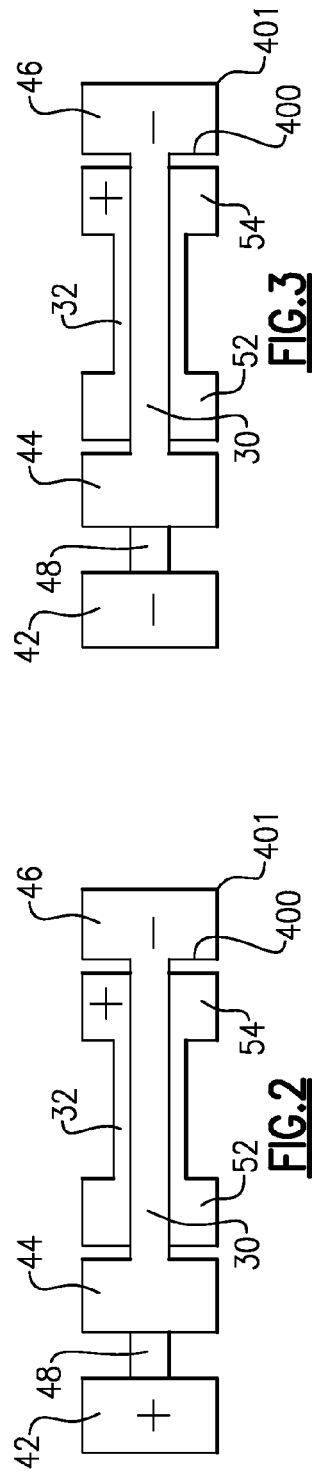

GAS TURBINE ENGINE WITH HIGH SPEED LOW PRESSURE TURBINE SECTION

CROSS-REFERENCE TO RELATED APPLICATION

This application is a continuation-in-part of U.S. application Ser. No. 13/410,776, filed Mar. 2, 2012, which claims priority to U.S. Provisional Application No. 61/604,653, filed Feb. 29, 2012, and is a continuation-in-part of U.S. patent application Ser. No. 13/363,154, filed on Jan. 31, 2012.

BACKGROUND OF THE INVENTION

This application relates to a gas turbine engine wherein the low pressure turbine section is rotating at a higher speed and centrifugal pull stress relative to the high pressure turbine section speed and centrifugal pull stress than prior art engines.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section.

Traditionally, on many prior art engines the low pressure turbine section has driven both the low pressure compressor section and a fan directly. As fuel consumption improves with larger fan diameters relative to core diameters it has been the trend in the industry to increase fan diameters. However, as the fan diameter is increased, high fan blade tip speeds may result in a decrease in efficiency due to compressibility effects. Accordingly, the fan speed, and thus the speed of the low pressure compressor section and low pressure turbine section (both of which historically have been coupled to the fan via the low pressure spool), have been a design constraint. More recently, gear reductions have been proposed between the low pressure spool (low pressure compressor section and low pressure turbine section) and the fan so as to allow the fan to rotate a different, more optimal speed.

SUMMARY

In a featured embodiment, a gas turbine engine comprises a fan and a compressor section in fluid communication with the fan. The compressor section includes a first compressor section and a second compressor section. A combustion section is in fluid communication with the compressor section. A turbine section is in fluid communication with the combustion section. The turbine section includes a first turbine section and a second turbine section. The first turbine section and the first compressor section rotate in a first direction. The second turbine section and the second compressor section rotate in a second direction, opposed to the first direction. The first turbine section has a first exit area at a first exit point and rotates at a first speed. The second turbine section has a second exit area at a second exit point and rotates at a second speed, which is higher than the first speed. A first performance quantity is defined as the product of the first speed squared and the first area. A second performance quantity is defined as the product of the second speed squared and the second area. A ratio of the first performance quantity to the second performance quantity is between about 0.5 and about 1.5. A gear reduction is included between the fan and a low spool driven by the first turbine section such that the fan rotates at a lower speed than the first turbine section.

In another embodiment according to the previous embodiment, the ratio is above or equal to about 0.8.

In another embodiment according to any of the previous embodiments, the ratio is above or equal to about 1.0.

In another embodiment according to any of the previous embodiments, the gear reduction causes the fan to rotate in the second opposed direction.

In another embodiment according to any of the previous embodiments, the gear reduction causes the fan to rotate in the first direction.

In another embodiment according to any of the previous embodiments, the gear reduction is a planetary gear reduction.

In another embodiment according to any of the previous embodiments, a gear ratio of the gear reduction is greater than about 2.3.

In another embodiment according to any of the previous embodiments, the gear ratio is greater than about 2.5.

In another embodiment according to any of the previous embodiments, the fan delivers a portion of air into a bypass duct. A bypass ratio is defined as the portion of air delivered into the bypass duct divided by the amount of air delivered into the first compressor section, with the bypass ratio being greater than about 6.0.

In another embodiment according to any of the previous embodiments, the bypass ratio is greater than about 10.0.

In another embodiment according to any of the previous embodiments, the fan has 26 or fewer blades.

In another embodiment according to any of the previous embodiments, the first turbine section has at least three stages.

In another embodiment according to any of the previous embodiments, the first turbine section has up to six stages.

In another embodiment according to any of the previous embodiments, a pressure ratio across the first turbine section is greater than about 5:1.

In another embodiment according to any of the previous embodiments, a third turbine section drives the fan, the second and third the turbine rotors each drive a compressor rotor of the compressor section.

In another embodiment according to any of the previous embodiments, the gear reduction is positioned intermediate the fan and a compressor rotor driven by the first turbine section.

In another embodiment according to any of the previous embodiments, the gear reduction is positioned intermediate the first turbine section and a compressor rotor driven by the first turbine section.

In another featured embodiment, a turbine section of a gas turbine engine comprises a first turbine section and a second turbine section. The first turbine section has a first exit area at a first exit point and rotates at a first speed. The first turbine section has at least 3 stages. The second turbine section has a second exit area at a second exit point and rotates at a second speed, which is faster than the first speed. The second turbine section has 2 or fewer stages. A first performance quantity is defined as the product of the first speed squared and the first area. A second performance quantity is defined as the product of the second speed squared and the second area. A ratio of the first performance quantity to the second performance quantity is between about 0.5 and about 1.5.

In another embodiment according to the previous embodiment, the first and second turbine sections are designed to rotate in opposed directions relative to each other.

In another embodiment according to any of the previous embodiments, a pressure ratio across the first turbine section is greater than about 5:1.

In another embodiment according to any of the previous embodiments, the ratio of the performance quantities is above or equal to about 0.8.

In another embodiment according to any of the previous embodiments, the ratio is above or equal to about 1.0.

In another embodiment according to any of the previous embodiments, the first turbine section has up to six stages.

BRIEF DESCRIPTION OF THE DRAWINGS

FIG. 1 shows a gas turbine engine.

FIG. 2 schematically shows the arrangement of the low and high spool, along with the fan drive.

FIG. 3 schematically shows an alternative drive arrangement.

DETAILED DESCRIPTION

Figure 4:
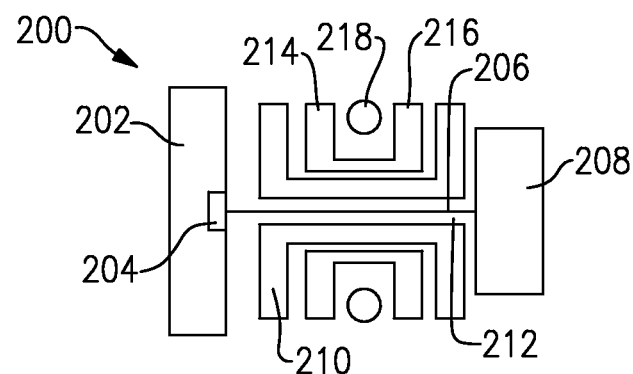
FIG. 4 shows another embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor section 52 and the high pressure turbine section 54. A mid-turbine frame 57 of the engine static structure 36 is arranged generally between the high pressure turbine section 54 and the low pressure turbine section 46. The mid-turbine frame 57 further supports bearing systems 38 in the turbine section 28. As used herein, the high pressure turbine section experiences higher pressures than the low pressure turbine section. A low pressure turbine section is a section that powers a fan 42. The inner shaft 40 and the outer shaft 50 are concentric and rotate via bearing systems 38 about the engine central longitudinal axis A which is collinear with their longitudinal axes. The high and low spools can be either co-rotating or counter-rotating.

The core airflow C is compressed by the low pressure compressor section 44 then the high pressure compressor section 52, mixed and burned with fuel in the combustor 56, then expanded over the high pressure turbine section 54 and low pressure turbine section 46. The mid-turbine frame 57 includes airfoils 59 which are in the core airflow path. The turbine sections 46, 54 rotationally drive the respective low speed spool 30 and high speed spool 32 in response to the expansion.

The engine 20 in one example is a high-bypass geared aircraft engine. The bypass ratio is the amount of air delivered into bypass path B divided by the amount of air into core path C. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine section 46 has a pressure ratio that is greater than about 5. In one disclosed embodiment, the engine 20 bypass ratio is greater than about ten (10:1), the fan diameter is significantly larger than that of the low pressure compressor section 44, and the low pressure turbine section 46 has a pressure ratio that is greater than about 5:1. In some embodiments, the high pressure turbine section may have two or fewer stages. In contrast, the low pressure turbine section 46, in some embodiments, has between 3 and 6 stages. Further the low pressure turbine section 46 pressure ratio is total pressure measured prior to inlet of low pressure turbine section 46 as related to the total pressure at the outlet of the low pressure turbine section 46 prior to an exhaust nozzle. The geared architecture 48 may be an epicycle gear train, such as a planetary gear system or other gear system, with a gear reduction ratio of greater than about 2.5:1.

When it is desired that the fan rotate in the same direction as the low pressure turbine section, then a planetary gear system may be utilized. On the other hand, if it is desired that the fan rotate in an opposed direction to the direction of rotation of the low pressure turbine section, then a star-type gear reduction may be utilized. A worker of ordinary skill in the art would recognize the various options with regard to gear reductions available to a gas turbine engine designer. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ("TSFC"). TSFC is the industry standard parameter of the rate of lbm of fuel being burned per hour divided by lbf of thrust the engine produces at that flight condition. "Low fan pressure ratio" is the ratio of total pressure across the fan blade alone, before the fan exit guide vanes. The low fan pressure ratio as disclosed herein according to one non-limiting embodiment is less than about 1.45. "Low corrected fan tip speed" is the actual fan tip speed in ft/sec divided by an industry standard temperature correction of $[(\text{Ram Air Temperature deg R})/518.7]^{0.5}$. The "Low corrected fan tip speed" as disclosed herein according to one non-limiting embodiment is less than about 1150 ft/second. Further, the fan 42 may have 26 or fewer blades.

An exit area 400 is shown, in FIG. 1 and FIG. 2, at the exit location for the high pressure turbine section 54. An exit area for the low pressure turbine section is defined at exit 401 for the low pressure turbine section. As shown in FIG. 2, the turbine engine 20 may be counter-rotating. This means that the low pressure turbine section 46 and low pressure compressor section 44 rotate in one direction, while the high pressure spool 32, including high pressure turbine section 54 and high pressure compressor section 52 rotate in an opposed direction. The gear reduction 48, may be selected such that the fan 42 rotates in the same direction as the high spool 32 as shown in FIG. 2.

Another embodiment is illustrated in FIG. 3. In FIG. 3, the fan rotates in the same direction as the low pressure spool 30. To achieve this rotation, the gear reduction 48 may be a planetary gear reduction which would cause the fan 42 to rotate in the same direction. With either arrangement, and with the other structure as set forth above, including the various quantities and operational ranges, a very high speed can be provided to the low pressure spool. Low pressure turbine section and high pressure turbine section operation are often evaluated looking at a performance quantity which is the exit area for the turbine section multiplied by its respective speed squared. This performance quantity ("PQ") is defined as:

$$PQ_{lpt} = (A_{lpt} \times V_{lpt}^2) \qquad \text{Equation 1:}$$

$$PQ_{hpt} = (A_{hpt} \times V_{hpt}^2) \qquad \text{Equation 2:}$$

where $A_{lpt}$ is the area of the low pressure turbine section at the exit thereof (e.g., at 401), where $V_{lpt}$ is the speed of the low pressure turbine section, where $A_{hpt}$ is the area of the high pressure turbine section at the exit thereof (e.g., at 400), and where $V_{hpt}$ is the speed of the low pressure turbine section. As known, one would evaluate this performance quantity at the redline speed for each turbine section.

Thus, a ratio of the performance quantity for the low pressure turbine section compared to the performance quantify for the high pressure turbine section is:

$$(A_{lpt} \times V_{lpt}^2)/(A_{hpt} \times V_{hpt}^2) = PQ_{lpt}/PQ_{hpt} \qquad \text{Equation 3:}$$

In one turbine embodiment made according to the above design, the areas of the low and high pressure turbine sections are 557.9 in$^2$ and 90.67 in$^2$, respectively. Further, the redline speeds of the low and high pressure turbine sections are 10179 rpm and 24346 rpm, respectively. Thus, using Equations 1 and 2 above, the performance quantities for the low and high pressure turbine sections are:

$$PQ_{lpt} = (A_{lpt} \times V_{lpt}^2) = (557.9 \text{ in}^2)(10179 \text{ rpm})^2 = 57805157673.9 \text{ in}^2 \text{ rpm}^2 \qquad \text{Equation 1:}$$

$$PQ_{hpt} = (A_{hpt} \times V_{hpt}^2) = (90.67 \text{ in}^2)(24346 \text{ rpm})^2 = 53742622009.72 \text{ in}^2 \text{ rpm}^2 \qquad \text{Equation 2:}$$

and using Equation 3 above, the ratio for the low pressure turbine section to the high pressure turbine section is:

$$\text{Ratio} = PQ_{lpt}/PQ_{hpt} = 57805157673.9 \text{ in}^2 \text{ rpm}^2/53742622009.72 \text{ in}^2 \text{ rpm}^2 = 1.075$$

In another embodiment, the ratio was about 0.5 and in another embodiment the ratio was about 1.5. With $PQ_{lpt}/PQ_{hpt}$ ratios in the 0.5 to 1.5 range, a very efficient overall gas turbine engine is achieved. More narrowly, $PQ_{lpt}/PQ_{hpt}$ ratios of above or equal to about 0.8 are more efficient. Even more narrowly, $PQ_{lpt}/PQ_{hpt}$ ratios above or equal to 1.0 are even more efficient. As a result of these $PQ_{lpt}/PQ_{hpt}$ ratios, in particular, the turbine section can be made much smaller than in the prior art, both in diameter and axial length. In addition, the efficiency of the overall engine is greatly increased.

The low pressure compressor section is also improved with this arrangement, and behaves more like a high pressure compressor section than a traditional low pressure compressor section. It is more efficient than the prior art, and can provide more work in fewer stages. The low pressure compressor section may be made smaller in radius and shorter in length while contributing more toward achieving the overall pressure ratio design target of the engine. Moreover, as a result of the efficiency increases in the low pressure turbine section and the low pressure compressor section in conjunction with the gear reductions, the speed of the fan can be optimized to provide the greatest overall propulsive efficiency.

FIG. 4 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

Figure 5:
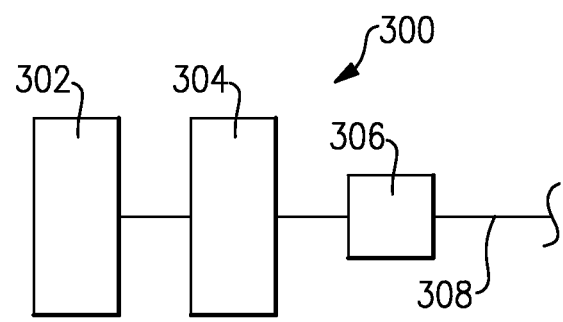
FIG. 5 shows yet another embodiment.

FIG. 5 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The FIG. 4 or 5 engines may be utilized with the features disclosed above.

While this invention has been disclosed with reference to one embodiment, it should be understood that certain modifications would come within the scope of this invention. For that reason, the following claims should be studied to determine the true scope and content of this invention.

The invention claimed is:
1. A gas turbine engine comprising:
   a fan;
   a compressor section in fluid communication with the fan, the compressor section including a first compressor section and a second compressor section;
   a combustion section in fluid communication with the compressor section;
   a turbine section in fluid communication with the combustion section;
   wherein the turbine section includes a first turbine section and a second turbine section;
   wherein said first turbine section has a first exit area at a first exit point and is configured to rotate at or below a first speed;
   wherein said second turbine section has a second exit area at a second exit point and is configured to rotate at or below a second speed, which is higher than the first speed, said first and second speeds being redline speeds;
   wherein a first performance quantity is defined as the product of the first speed squared and the first area;
   wherein a second performance quantity is defined as the product of the second speed squared and the second area;

wherein a ratio of the first performance quantity to the second performance quantity is between 0.5 and 1.5; and wherein a gear reduction is included between said fan and a low spool driven by the first turbine section such that the fan rotates at a lower speed than the first turbine section.

2. The gas turbine engine as set forth in claim 1, wherein said ratio is above or equal to 0.8.

3. The gas turbine engine as set forth in claim 2, wherein said ratio is above or equal to 1.0.

4. The gas turbine engine as set forth in claim 1, wherein said fan has 26 or fewer blades.

5. The gas turbine engine as set forth in claim 1, wherein said first turbine section has at least three stages.

6. The gas turbine engine as set forth in claim 5, wherein said first turbine section has up to six stages.

7. The gas turbine engine as set forth in claim 1, wherein there is a third turbine section driving the fan, the second and third turbine rotors each driving a compressor rotor of the compressor section.

8. The gas turbine engine as set forth in claim 1, wherein the gear reduction is positioned intermediate the fan and a compressor rotor driven by the first turbine section.

9. The engine as set forth in claim 1, wherein the gear reduction is positioned intermediate the first turbine section and a compressor rotor driven by the first turbine section.

10. The gas turbine engine as set forth in claim 1, wherein the first turbine section and the first compressor section rotate in a first direction, and wherein the second turbine section and the second compressor section rotate in a second direction, opposed to said first direction.

11. The gas turbine engine as set forth in claim 10, wherein said gear reduction causes said fan to rotate in the second direction.

12. The gas turbine engine as set forth in claim 10, wherein said gear reduction causes said fan to rotate in the first direction.

13. The gas turbine engine as set forth in claim 12, wherein said gear reduction is a planetary gear reduction.

14. A turbine section of a gas turbine engine comprising:
a first turbine section;
a second turbine section;
wherein said first turbine section has a first exit area at a first exit point and is configured to rotate at or below a first speed, said first turbine section having at least 3 stages;
wherein said second turbine section has a second exit area at a second exit point and is configured to rotate at or below a second speed, which is faster than the first speed, said first and second speeds being redline speeds, said second turbine section having 2 or fewer stages;
wherein a first performance quantity is defined as the product of the first speed squared and the first area;
wherein a second performance quantity is defined as the product of the second speed squared and the second area; and
wherein a ratio of the first performance quantity to the second performance quantity is between 0.5 and 1.5.

15. The turbine section as set forth in claim 14, wherein said first and second turbine sections are designed to rotate in opposed directions relative to each other.

16. The turbine section as set forth in claim 14, wherein said ratio of the performance quantities is above or equal to 0.8.

17. The turbine section as set forth in claim 16, wherein said ratio is above or equal to 1.0.

18. The turbine section as set forth in claim 14, wherein said first turbine section has up to six stages.

* * * * *